(12) United States Patent
Werner et al.

(10) Patent No.: US 11,448,285 B2
(45) Date of Patent: Sep. 20, 2022

(54) MEMBRANE AND HYDRAULICALLY DAMPING MOUNT

(71) Applicant: VIBRACOUSTIC GMBH, Darmstadt (DE)

(72) Inventors: Philipp Werner, Lueneburg (DE); Hilrich Kardoes, Winsen (DE); Oliver Breiden, Hamburg (DE)

(73) Assignee: Vibracoustic SE, Darmstadt (DE)

( * ) Notice: Subject to any disclaimer, the term of this patent is extended or adjusted under 35 U.S.C. 154(b) by 133 days.

(21) Appl. No.: 16/617,688

(22) PCT Filed: Mar. 12, 2018

(86) PCT No.: PCT/EP2018/056120
§ 371 (c)(1),
(2) Date: Nov. 27, 2019

(87) PCT Pub. No.: WO2019/174715
PCT Pub. Date: Sep. 19, 2019

(65) Prior Publication Data
US 2020/0182327 A1    Jun. 11, 2020

(51) Int. Cl.
*F16F 13/10* (2006.01)
*F16F 13/14* (2006.01)
*B60K 5/12* (2006.01)
*F16F 13/26* (2006.01)

(52) U.S. Cl.
CPC ........ *F16F 13/106* (2013.01); *F16F 13/1427* (2013.01); *B60G 2204/143* (2013.01); *B60G 2204/41062* (2013.01); *B60K 5/1208* (2013.01); *F16F 13/103* (2013.01); *F16F 13/26* (2013.01); *F16F 2222/12* (2013.01)

(58) Field of Classification Search
CPC ...... F16F 13/10; F16F 113/103; F16F 13/106; F16F 13/105; F16F 13/18; F16F 13/26; F16F 13/1427; F16F 2222/12
See application file for complete search history.

(56) References Cited

U.S. PATENT DOCUMENTS

| | | | | |
|---|---|---|---|---|
| 4,572,490 A | * | 2/1986 | Alciati | F16F 13/20 267/140.11 |
| 4,936,556 A | * | 6/1990 | Makibayashi | F16F 13/16 267/140.13 |
| 5,595,373 A | * | 1/1997 | Ikeda | F16F 13/14 267/140.12 |

(Continued)

FOREIGN PATENT DOCUMENTS

| | | |
|---|---|---|
| DE | 19833537 A1 | 2/2000 |
| JP | H-0815041 A | 6/1996 |

OTHER PUBLICATIONS

International Search Report PCT/EP2018/056120, filed Dec. 19, 2018.

(Continued)

*Primary Examiner* — Thomas W Irvin
(74) *Attorney, Agent, or Firm* — Fishman Stewart PLLC

(57) ABSTRACT

A membrane for a hydraulically damping mount includes a first leg, a second leg and a base interconnecting the two legs. In embodiments, in an average thickness of one of the two legs is at least twice as thick as that of the other leg. A hydraulically damping mount with such a membrane is also disclosed.

15 Claims, 4 Drawing Sheets

(56) References Cited

U.S. PATENT DOCUMENTS

| | | | | |
|---|---|---|---|---|
| 5,690,320 A * | 11/1997 | Kanda | ............... | F16F 13/16 |
| | | | | 267/140.12 |
| 6,443,438 B2 * | 9/2002 | Satori | ............... | F16F 13/105 |
| | | | | 267/140.13 |
| 6,663,090 B2 * | 12/2003 | Simuttis | ............... | F16F 13/18 |
| | | | | 267/140.13 |
| 6,820,867 B2 * | 11/2004 | Satori | ............... | F16F 13/108 |
| | | | | 267/140.13 |
| 6,981,696 B2 * | 1/2006 | Hatano | ............... | F16F 13/16 |
| | | | | 267/140.12 |
| 7,140,602 B2 * | 11/2006 | Goto | ............... | F16F 13/103 |
| | | | | 267/140.13 |
| 7,168,692 B2 * | 1/2007 | Maeno | ............... | F16F 13/103 |
| | | | | 267/140.13 |
| 7,458,565 B2 * | 12/2008 | Miyahara | ............... | F16F 1/3849 |
| | | | | 248/636 |
| 8,056,888 B2 * | 11/2011 | Siemer | ............... | F16F 13/10 |
| | | | | 267/140.5 |
| 8,191,876 B2 * | 6/2012 | Kanaya | ............... | F16F 13/18 |
| | | | | 267/140.13 |
| 9,200,694 B2 * | 12/2015 | Kojima | ............... | F16F 13/108 |
| 9,243,679 B2 * | 1/2016 | Shimamura | ............... | F16F 13/108 |
| 9,470,286 B2 * | 10/2016 | Saito | ............... | F16F 13/107 |
| 10,215,252 B2 * | 2/2019 | Parr | ............... | F16F 13/1481 |
| 11,022,195 B2 * | 6/2021 | Werner | ............... | F16F 13/1481 |
| 2003/0001322 A1 * | 1/2003 | Goto | ............... | F16F 13/108 |
| | | | | 267/140.11 |
| 2004/0183241 A1 * | 9/2004 | Goto | ............... | F16F 13/18 |
| | | | | 267/140.13 |
| 2006/0220289 A1 * | 10/2006 | Okumura | ............... | F16F 13/103 |
| | | | | 267/140.13 |
| 2006/0261531 A1 * | 11/2006 | Kim | ............... | F16F 13/16 |
| | | | | 267/140.13 |
| 2013/0033054 A1 * | 2/2013 | Wittmershaus | ......... | F16F 13/24 |
| | | | | 267/140.13 |
| 2013/0038006 A1 | 2/2013 | Saito et al. | | |
| 2013/0187318 A1 | 7/2013 | Shimamura | | |
| 2018/0066726 A1 * | 3/2018 | Parr | ............... | F16F 13/1481 |
| 2019/0389296 A1 * | 12/2019 | Kojima | ............... | B60K 5/1208 |
| 2020/0325957 A1 * | 10/2020 | Werner | ............... | F16F 1/3876 |

OTHER PUBLICATIONS

Chinese Second Office Action, 201880034833.6, dated May 18, 2021.

Translation of Chinese Second Office Action, 201880034833.6, dated May 18, 2021.

European Office Action, 18712534.9, dated May 5, 2022, with Translation.

* cited by examiner

MEMBRANE AND HYDRAULICALLY DAMPING MOUNT

CROSS-REFERENCE TO RELATED APPLICATIONS

This application is a national phase application of and claims priority to International Patent Application No. PCT/EP2018/056120, filed Mar. 12, 2018, the contents of which are hereby incorporated by reference in its entirety.

TECHNICAL FIELD

The present invention relates to a membrane for a hydraulically damping mount, particularly to an intermediate membrane for a hydraulically damping mount, which has a first leg, a second leg and a base interconnecting the two legs. The invention further relates to a mount damping hydraulically in the axial direction, particularly to a subframe mount damping hydraulically in the axial direction, a body mount damping hydraulically in the axial direction, a strut mount damping hydraulically in the axial direction or a motor vehicle power unit mount damping hydraulically in the axial direction, with such a membrane.

BACKGROUND

Hydraulically damping mounts of the type mentioned in the introduction are also referred to as hydromounts and used as chassis mounts, e.g. as subframe mounts, body mounts or strut mounts, or as power unit mounts in motor vehicles, in order to dampen and/or absorb occurring vibrations. They are characterized by their axially stacked fluid chambers, which are separated from one another by membranes and/or elastomer bodies and are interconnected in a liquid-conducting manner via a damping duct. During a relative movement in the axial direction of the core relative to the outer sleeve, or vice versa, one of the two working chambers is compressed, or the other one enlarged. Thus, the fluid located therein flows from the one chamber into the other working chamber via the damping duct. A damping and/or absorbing effect is thus obtained.

SUMMARY

The present invention deals with a hydraulically damping mount used in the region of the chassis, and particularly for supporting a subframe of a motor vehicle. Such a mount may also be referred to as a subframe mount and serves for providing support and damping against the forces and vibrations acting on a subframe. For this purpose, the mount is inserted into a tubular receiving eye formed in the subframe, or screw-connected to a flange. Thus, the radial construction space of the axially damping mount is limited by the diameter of the receiving eye or the flange. A large part of the mount with its fluid chambers is accommodated in this radially limited construction space. Thus, the membranes and/or elastomer bodies delimiting the fluid chambers are limited with regard to their length and are thus capable of withstanding only limited radial and/or axial deflections of the hydromount with life cycle stability. In addition, the membranes, apart from the translational deflections, also inflate due to the dynamically produced internal pressure in the fluid chambers. Moreover, if a large axial pre-stress is applied to the subframe mount, static axial paths materialize in the design position, which is also referred to as the K0 position, which are superimposed with the dynamic paths while driving.

An elastic chassis mount for mounting a twist beam axle comprising an axial collar, a radial base body and a radial deflection is apparent from DE 198 33 537 A1.

U.S. Pat. No. 4,936,556 B1 and U.S. Pat. No. 9,470,286 B2 show hydraulically damping mounts having a core and an outer sleeve surrounding the core. The outer sleeve has flange portions for attaching the mount to a vehicle body. An elastomer body absorbing the axial stresses, an intermediate membrane and a second elastomer body are disposed between the core and the outer sleeve. The elastomer body absorbing the axial stresses and the intermediate membrane delimit a first fluid chamber, and the intermediate membrane and the second elastomer body delimit a second fluid chamber, which are interconnected via a damping duct.

The present invention is based on the object of providing a membrane and a hydraulically damping mount that have a large degree of mobility in the translational directions and a high inflation stiffness, and that have an improved damping action and long life cycle at the same time.

A membrane and a hydraulically damping mount are proposed for achieving the object.

Advantageous embodiments of the membrane and of the hydraulically damping mount are disclosed.

In the following, X-direction is understood to be the direction in which a motor vehicle moves. In the following, Y-direction is understood to be a direction transverse to the direction of travel, and Z-direction is hereinafter understood to be the direction of the height of the motor vehicle, which constitutes the axial direction of the mount.

According to one aspect, a membrane for a hydraulically damping mount is proposed, particularly an intermediate membrane for a hydraulically damping mount, which has a first leg, a second leg and a base interconnecting the two legs, wherein an average thickness of one of the two legs is at least twice as thick as that of the other leg.

In the sense of the invention, the average thickness is understood to be the average value of the thickness of a leg over its entire length, i.e. from the base to its free end.

Since the average thickness of one leg is at least twice as large as that of the other leg, the membrane is capable of executing large movements in the axial direction and/or in radial directions. In addition, the membrane is not susceptible to inflation due to large pressure differences between the two fluid chambers filled with fluid. In most operational states, this leads to a high inflation stiffness of the membrane, which results in a large pumping volume and thus in an improved damping effect. In addition, this configuration ensures that the membrane is very stiff in the case of pressure differences between the fluid chambers. Advantageously, the base is configured in a U-shaped manner with a uniform thickness, wherein the legs protrude from the U-shaped base. In an advantageous embodiment, the membrane is largely rotationally symmetric about an axis of symmetry.

The cross section of the leg that is, on average, twice as thick may continuously expand starting from the base. The leg that is at least twice as thick may expand continuously or discontinuously. The leg that is, on average, twice as thick may expand, starting from the base, in a funnel shape, for example. Thus, the leg that is at least twice as thick has a very large inflation stiffness compared to the other leg, but at the same time, in the case of large translational deflections, it has a harmonic bending line that results in low elongation strain and thus in a long life cycle of the intermediate membrane. In an advantageous configuration, the leg that is, on average, twice as thick bends in the direction of the core in the case of a differential pressure in which the fluid chamber configured as a working chamber has a higher pressure than the fluid chamber configured as a compensating chamber, wherein the base interconnecting the two legs comes to rest against the core. In this position, the membrane has a particularly high inflation stiffness, so that a high pumping capacity and, in connection therewith, a large damping effect can be obtained.

In an advantageous embodiment, the leg that is, on average, twice as thick has a first length, and the other leg has a second length, wherein the first length is greater than or equal to the second length. This is necessary because the longer leg is responsible for the large mobility in translational directions. At the same time, a greater length, however, results in low inflation stiffness and thus in a low pumping capacity. This is compensated by the greater thickness of the longer leg. In this manner, a membrane geometry is realized which is characterized by a long life cycle, but at the same time also enables a good pumping action in the axial direction. In an advantageous embodiment, the first length is at least twice as large as the second length. The upper surface and the lower surface of the membrane may each have as uniform a profile as possible, so that the membrane does not have any major thickness changes. The length of each leg is defined by the distance in the Z-direction between the lower reversing point of the base and the highest attachment point of the respective leg.

In the case of surfaces of the membrane extending in as uniform a manner as possible, as a result of which the membrane exhibits no major thickness changes, the mathematical derivative of the function describing the upper surface in the reversing point of the base equals zero. This also applies to the derivative of the functions describing the lower geometry of the legs, whose mathematical derivative at their highest point either also becomes zero, alternatively runs off into a stiff connecting region, or may have a discontinuity. In effect, the upper attachment point of the radially outer membrane is defined such that, beyond this point, appreciable elongations in the elastomer of the connection due to the movements of the membrane no longer occur.

In an advantageous embodiment, the leg that is, on average, twice as thick forms the radially outer leg. This results in a better combination of the bending line of the radially outer leg and a rolling fold in the base, and thus in a longer life cycle, if a movement in the Z-direction is superimposed with a movement in the Y-direction. Furthermore, a better support of the base on an inner sleeve and/or a core of a hydraulically damping mount is obtained.

In an advantageous embodiment, the legs have at their extremities a connecting portion that can be connected positively, non-positively and/or by substance-to-substance connection to a core, or an inner tube, and/or an outer tube of a hydraulically damping mount. At their ends, the connecting portions may be provided with fastening members for attachment to an outer tube or a core or an inner tube.

In an advantageous embodiment, the mutually facing surfaces of the connecting portion and/or the inner sleeve and the radially inner leg are spaced apart from each other, wherein a distance A is between approx. 1 mm and approx. 10 mm. Advantageously, the distance A is between approx. 2 mm and approx. 3 mm. Thus, a high pumping capacity and therefore a high level of damping is obtained at large amplitudes. By configuring the distance to be as small as possible, the base of the membrane, in the case of large amplitudes, can come to rest against the inner sleeve and thus gain inflation stiffness, which results in a good pumping action and thus a high damping capacity or absorptive effect of the mount.

In an advantageous embodiment, the connecting portions are connected to an inner sleeve and/or an outer sleeve, wherein the inner sleeve can be pushed onto the core and the outer sleeve can be inserted into the outer tube. As a result, the membrane can be manufactured as a separate component and then mounted onto a core, particularly and inner tube, or inserted into an outer tube. The inner sleeve may be pressed onto a core, and the outer sleeve may be pressed into an outer tube. For this purpose, the inner sleeve may have a diameter that is smaller than the outer diameter of the core, and the outer sleeve may have an outer diameter that is greater than the inner diameter of the outer tube. The inner sleeve and the outer sleeve may be connected to the intermediate membrane by substance-to-substance connection. The inner sleeve and the outer sleeve may be made from metal or plastic.

In an advantageous embodiment, a damping duct is incorporated into the outer sleeve of the membrane.

According to another aspect, there is proposed a mount damping hydraulically in the axial direction, particularly a subframe mount damping hydraulically in the axial direction, a body mount damping hydraulically in the axial direction, a strut mount damping hydraulically in the axial direction or a power unit mount damping hydraulically in the axial direction, which is inserted into a receiving eye of a motor vehicle. The hydraulically damping mount comprises a core and an outer tube surrounding the core, wherein a first elastomer body, a membrane, and a second elastomer body are disposed between the core and the outer tube, wherein the first elastomer body and the membrane delimit a first fluid chamber, and the membrane and the second elastomer delimit a second fluid chamber, and wherein the fluid chambers are filled with a fluid and are interconnected in a fluid-conducting manner via a damping duct.

Since the hydraulically damping mount includes the membrane according to the invention, the hydraulically damping mount has a high inflation stiffness, a large pumping capacity and, as a result, an improved damping or absorptive effect.

The fluid chamber delimited by the first elastomer body and the membrane may also be referred to as a working chamber, and the fluid chamber delimited by the membrane and the second elastomer body may also be referred to as a compensating chamber.

Geometrically, the first elastomer body may be configured in such a way that it can be manufactured in a vulcanization tool without laterally opening ledges. As a result, the first elastomer body can be manufactured in a simple and cost-effective manner.

In an advantageous embodiment, a third elastomer body may be disposed between the core and the outer tube.

In an advantageous embodiment, the first elastomer body is an axial mount. The third elastomer body may be a radial mount. In an advantageous embodiment, at least one intermediate metal sheet is inserted into the third elastomer body. In an advantageous embodiment, the second elastomer body is a compensating membrane.

In the hydraulically damping mount, the first elastomer body configured as an axial mount has a higher stiffness in the Z-direction compared with the radial directions X and Y. In contrast, the third elastomer body configured as a radial mount has a high stiffness in the Y-direction, compared to the axial mount. In an advantageous embodiment, the radial mount has a low stiffness in the Z-direction. The desired characteristics of the mount can be constructionally adjusted in a particularly simple manner as a result of this consistent division of the overall stiffness of the mount into the stiffness contributions in the X and Z-directions. Furthermore, a mount characterized by a long life cycle and an improved damping or absorptive action can be produced in this manner.

The axial mount is capable, in operation, of absorbing great static axial prestresses or stresses in the Z-direction over the intended life cycle.

Since the radial mount dominates the stiffness in the Y-direction, and the axial mount the stiffness in the Z-direction, the axially damping hydromount is easy to adjust to the desired Z-characteristic and Z-progression.

Since the axial mount is capable of absorbing large axial pre-stresses in the Z-direction, the compensating membrane, the intermediate membrane and the radial mount may also be mounted in a biased manner during assembly, so that they exhibit a reduced to no axial deflection in the K0-position, due to the axial prestress in the Z-direction acting on the mount. This promotes the life cycle stability of the compensating membrane, the intermediate membrane and the radial mount.

The absorption by the axial mount of the pre-stresses in the Z-direction further results in the elastomer in the radial mount having no, or only minor, prestress-related elongation. As a result, the radial mount can be designed with a lower rubber thickness and a high stiffness in the Y-direction without negatively affecting the life cycle of the radial mount by the high pre-stress acting on the mount. As a result, it is likely that large elastomeric or rubber elements with complex intermediate metals sheet structures for adjusting the required stiffness conditions can be avoided.

However, if high levels of stiffness in the Y-direction are required, then, in an advantageous embodiment, the mount, in addition to the compensating membrane, has a separate radial mount with an intermediate metal sheet, which may have a stiffness in the Y-direction that is greater by a factor of at least 10 than its stiffness in the Z-direction.

Also advantageously, the axial mount may have a stiffness in the Z-direction that is greater by a factor of at least 2 than the stiffness of the radial mount in the Z-direction.

In an advantageous embodiment, the first elastomer body is connected positively, non-positively and/or by substance-to-substance connection to the outer sleeve. For example, the first elastomer body may be attached by vulcanization to the outer tube, particularly to a collar portion formed on the outer tube. Moreover, the first elastomer body may be attached by vulcanization to a ring with or without a collar structure, which is connected to the outer tube. If an outer sleeve made from metal is used, the ring may be connected to the outer tube by roller-knurling or crimping, by the collar of the outer tube being crimped or roller-knurled. If a plastic outer tube is used, the ring and the outer sleeve can be connected by substance-to-substance connection using laser beam welding, provided the ring also consists of plastic. A separate rubber seal may be disposed between the outer tube and the ring in order to seal the ring with respect to the outer sleeve; however, the welding seam may also serve for fixing and sealing at the same time.

In an advantageous embodiment, the first elastomer body, the second elastomer body and/or the third elastomer body are connected positively, non-positively and/or by substance-to-substance connection to the outer sleeve and/or the core. In each case at their ends, the first elastomer body, the second elastomer body and/or the third elastomer body may be provided with fastening members for the positive, non-positive and/or substance-to-substance attachment to the outer tube or the core. These fastening members may include seals, particular for the case where no substance-to-substance connection with the outer tube or the core is provided. Moreover, the first elastomer body, the second elastomer body and or the third elastomer body may be attached by vulcanization to the outer tube and/or the core.

Also advantageously, the second elastomer body and/or the third elastomer body have an inner sleeve and/or an outer sleeve, wherein the inner sleeve can be pushed onto the core and the outer sleeve can be inserted into the outer tube. As a result, the second elastomer body and/or the third elastomer body can be manufactured as separate components, in order to have a great freedom in designing the geometry of the elastomer bodies, and then be mounted on the core or inserted into inner tube, in order to axially bias the second elastomer body and/or the third elastomer body against the first elastomer body. The inner sleeve may be pressed onto the core, and the outer sleeve may be pressed into the outer tube. For this purpose, the inner sleeve may have a diameter that is smaller than the outer diameter of the core, and the outer sleeve may have an outer diameter that is greater than the inner diameter of the outer tube. The inner sleeve and the outer sleeve may be connected to the second elastomer body and/or the third elastomer body by substance-to-substance connection. The inner sleeve and the outer sleeve may be made from metal or plastic.

In an advantageous embodiment, the first elastomer body protrudes in the axial direction from the outer tube in such a way that the first elastomer body, in the inserted state, is substantially disposed outside the receiving eye. Since the first elastomer body is disposed outside the receiving eye, it is geometrically limited, radially, not to the receiving eye but only by the available construction space outside the receiving eye, so that the first elastomer body can have a large outer diameter and thus a large elongation length. Thus, the first elastomer body can be configured to have a particularly good life cycle stability. Furthermore, the first elastomer body, which simultaneously acts as a pumping membrane, can produce a large effective pumping surface with a large outer diameter. In addition, the first elastomer body is capable of absorbing large static pre-stresses. By the core and the outer tube overlapping in the axial direction, axial stiffness can be easily adjusted. Since the first elastomer body has no substantial overlap between the inner and outer connection in the radial direction, the contribution of the first elastomer body towards the radial overall stiffness of the mount is, on the one hand, only small, on the other hand, only small additional compressive and tensile elongations are produced due to the radial deflections of the mount in the first elastomer body. Thus, a state of life cycle stability at high pre-stresses can be set, and at the same time, the first elastomer body is capable of working predominantly in the pressure range.

Advantageously, the core is provided at its end with a stopper plate. The first elastomer body may have at least one stop, which is spaced apart from the stopper plate in the axial direction and limits a relative movement of the core relative to the outer tube in the axial direction. The stops may be formed with material uniformity from the first elastomer body. The stopper plate may be formed with material uniformity from the core or be a separate part connected positively, non-positively and/or by substance-to-substance connection to the core. The first elastomer body can be connected by substance-to-substance connection to the stopper plate, for instance by means of vulcanization or a post-bonding process. However, it is also possible for the elastomer body not to have any substance-to-substance connection to the stopper plate.

In an advantageous embodiment, the third elastomer body has stops spaced apart from the core. Advantageously, the stops act in the X-direction. Since the stops are spaced apart from the core, the third elastomer body has a low stiffness in the X-direction. In addition, the stops limit a relative movement of the core and the outer sleeve in the X-direction and thus increase the life cycle of the third elastomer body. Advantageously, the stops are connected to the outer sleeve. The stops may be formed with material uniformity from the third elastomer body. Advantageously, the third elastomer body is configured as a kidney mount. Also advantageously, the kidneys are sealed with a thin elastomeric membrane formed as a unit of the same material with the elastomer body, in order to prevent the entry of foreign matter and dirt into the interior of the mount.

In an advantageous embodiment, the third elastomer body includes at least one intermediate metal sheet. The intermediate metal sheet can be integrated into the elastomer body by vulcanization.

BRIEF DESCRIPTION OF THE DRAWINGS

The hydraulically damping mount, the membrane and further features and advantages are explained below in more detail with reference to exemplary embodiments that are schematically shown in the Figures. In the Figures.

DETAILED DESCRIPTION

Figure 1:
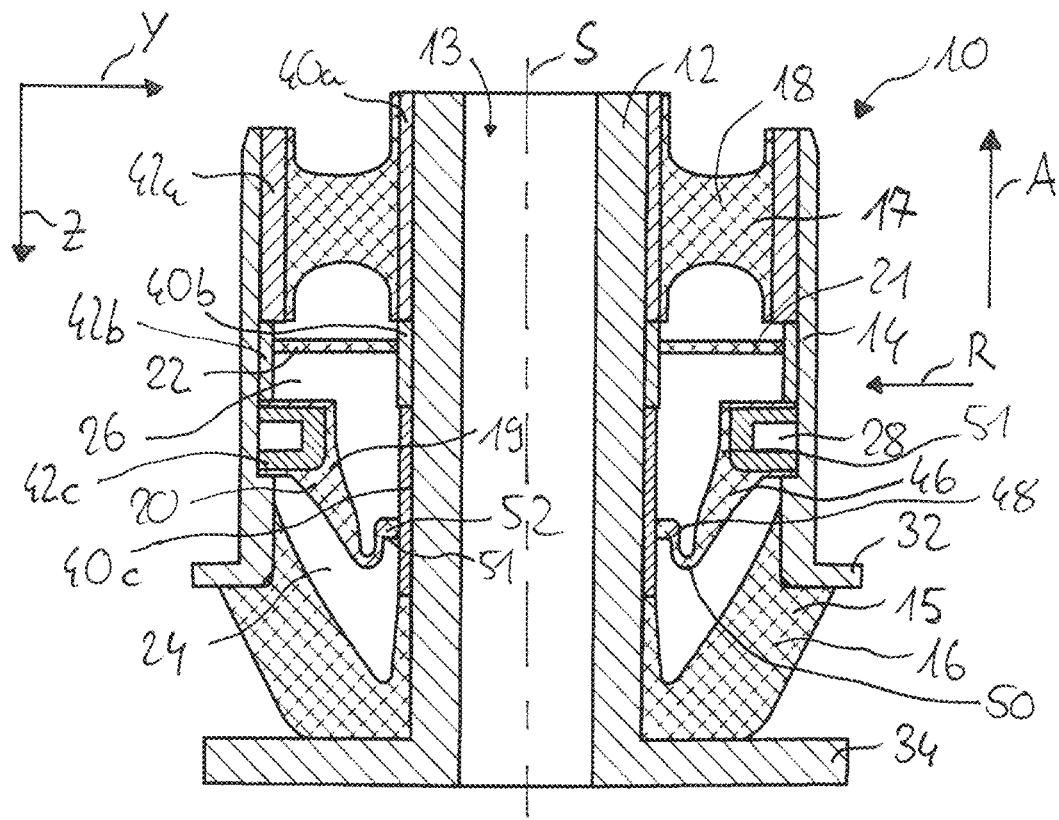
FIG. 1 shows a cross section through a hydraulically damping mount according to a first embodiment.
Figure 2:
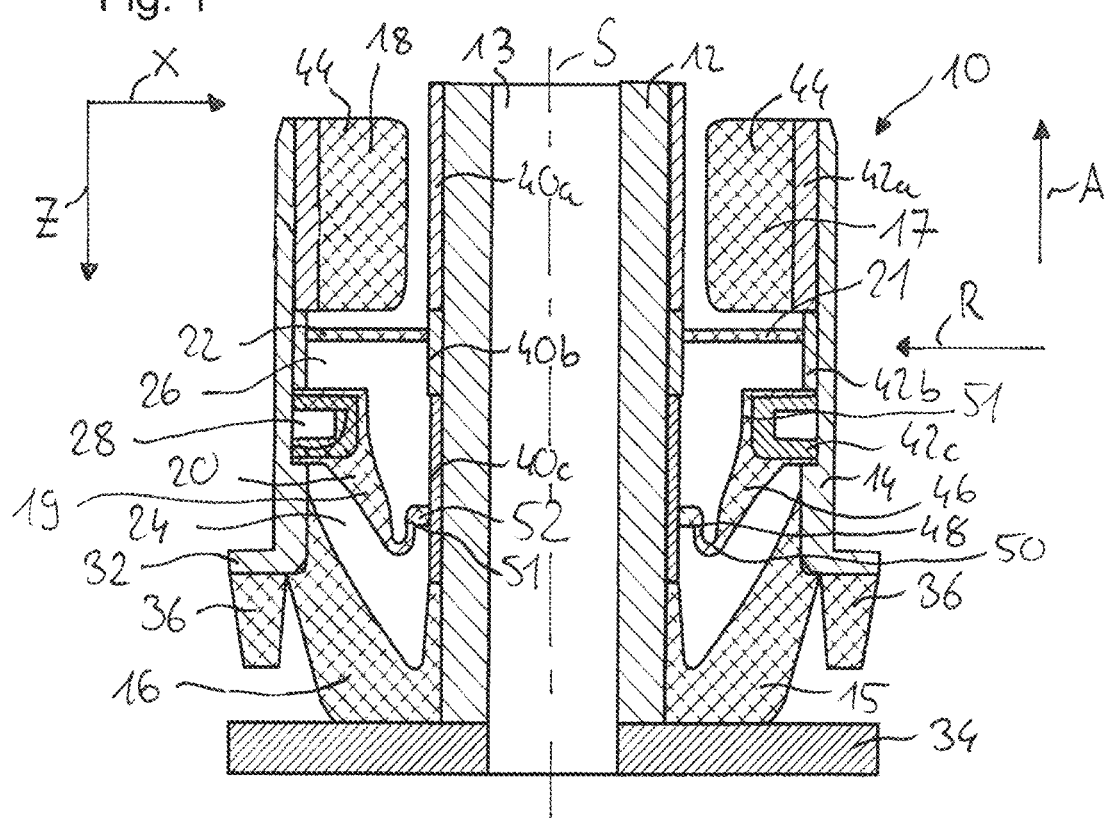
FIG. 2 shows a cross section along the line II-II of FIG. 1.

FIGS. 1 and 2 show a hydraulically damping mount 10, particularly a hydraulically damping subframe mount used for mounting a subframe of a motor vehicle, which is not shown. For this purpose, the mount 10 is inserted into a receiving eye of the subframe, which is not shown.

The mount 10 includes a core 12 and an outer tube 14 that surrounds the core 12 while forming a distance. The core 12 has a through-hole 13 through which a fastening member for attaching the mount 10 to the vehicle body can be passed. The mount 10 is inserted, in particular pressed, into a receiving eye of a subframe via the outer tube 14. The core 12 and the outer tube 14 may be made from metal or plastic.

A first elastomer body 15, a second elastomer body 21, a membrane 19 and a third elastomer body 17 are disposed between the core 12 and the outer tube 14. The first elastomer body 15 is configured as an axial mount 16, the third elastomer body 17 is configured as a radial mount 18, the membrane 19 is configured as an intermediate membrane 20, and the second elastomer body 21 is configured as a compensating membrane 22.

As is apparent from the FIGS. 1 and 2, the axial mount 16 and the intermediate membrane 20 delimit a first fluid chamber 24, and the intermediate membrane 20 and the compensating membrane 22 delimit a second fluid chamber 26. Both fluid chambers 24, 26 are filled with a fluid and interconnected in a fluid-conducting manner via a damping duct 28.

As is apparent from the FIGS. 1 and 2, the axial mount 16 has a first elastomer body 15, which is configured with an approximate hollow-cone shape and is connected to the core 12 and the outer tube 14 by substance-to-substance connection, particularly by vulcanization. In this case, the first elastomer body 15 is connected to the outer tube 14 in such a way that the former protrudes from the outer tube 14 in the axial direction A. In this way, the first elastomer body 15, in the inserted state, is substantially disposed outside the receiving eye.

In order to connect the first elastomer body 15 to the outer tube 14, the outer tube 14 has a collar portion 32 to which the first elastomer body 15 is attached by vulcanization. In addition, the first elastomer body 15 is attached by vulcanization to an inner face of the outer tube 14.

As is also apparent from FIGS. 1 and 2, the core 12 has at its end a stopper plate 34 which protrude perpendicularly from the core 12. The stopper plate 34 may be formed with material uniformity from the core 12, as is shown in FIG. 1, or may be a separate part connected positively, non-positively and/or by substance-to-substance connection to the core 12, as is shown in FIG. 2. The first elastomer body 15 is attached by vulcanization to an outer face of the core 12. In addition, the first elastomer body 15 can be connected by substance-to-substance connection to the stopper plate 34, by means of vulcanization or a post-bonding process.

In addition, in a non-adhering manner, the first elastomer body 15 may abut against the stopper plate 34 completely or in part, or not contact the latter in the K0-position. As is also apparent in FIG. 2, the first elastomer body 15 has first stops 36 that are spaced apart from the stopper plate in order to limit a relative movement of the core 12 and the outer tube 14.

The second elastomer body 21 configured as a radial mount 18 has an inner sleeve 40a and an outer sleeve 42a. The second elastomer body 21 extends in the radial direction R and is connected to the inner sleeve 40a and the outer sleeve 42a by substance-to-substance connection, in particular attached thereto by vulcanization. The radial mount 18 is attached to the core 12 and the outer tube 14 via the sleeves 40a, 42a, by the inner sleeve 40a being pushed, in particular pressed, onto the core 12, and the outer sleeve 42a is inserted, in particular pressed, into the opening of the outer tube 14. For this purpose, the inner sleeve 40a may have a diameter that is smaller than the outer diameter of the core 12, and the outer sleeve 42a may have an outer diameter that is greater than the inner diameter of the outer tube 14. As is also apparent from FIG. 2, the radial mount 18 has second stops 44 spaced apart from the core 12 or the inner sleeve 40a. The second stops 44 are formed with material uniformity from the second elastomer body 21.

The radial mount 18 is followed by the compensating membrane 22, which has an inner sleeve 40b and an outer sleeve 42b for attachment on the core 12 or in the outer tube 14. In order for the second fluid chamber 26 to be configured in a liquid-tight manner, sealing members that are not shown are to be provided, for instance, on the inner sleeve 40b and the outer sleeve 42b. The inner sleeve 40b is pushed, in particular pressed, onto the core 12, and the outer sleeve 42b is inserted, in particular pressed, into the opening of the outer tube 14. For this purpose, the inner sleeve 40b may have a diameter that is smaller than the outer diameter of the core 12, and the outer sleeve 42b may have an outer diameter that is greater than the inner diameter of the outer tube 14. The compensating membrane 22 is made from an elastomeric material.

The intermediate membrane 20, which has an inner sleeve 40c and an outer sleeve 42c for attachment on the core 12 or in the outer tube 14, is disposed between the compensating membrane 22 and the axial mount 16. The inner sleeve 40b is pushed, in particular pressed, onto the core 12, and the outer sleeve 42b is inserted, in particular pressed, into the opening of the outer tube 14. For this purpose, the inner sleeve 40b may have a diameter that is smaller than the outer diameter of the core 12, and the outer sleeve 42b may have an outer diameter that is greater than the inner diameter of the outer tube 14. The damping duct 28 is incorporated into the outer sleeve 42c. The intermediate membrane 20 is made from an elastomeric material.

Figure 3:
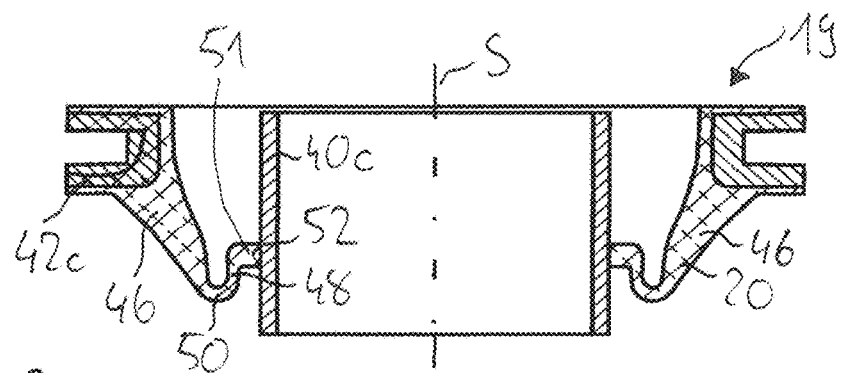
FIG. 3 shows an enlarged representation of a cross section through a membrane according to a first embodiment with an inner sleeve and an outer sleeve.

As is apparent, in particular, from FIG. 3, the intermediate membrane 20 is largely rotationally symmetric about an axis of symmetry S, wherein the intermediate membrane 20 has a first leg 46, a second leg 48 and a base 50 interconnecting the two legs. The base 50 is configured to be approximately U-shaped. The first leg 46 disposed radially outwards, wherein an average thickness of the first leg 46 is at least twice as thick as the average thickness of the second leg 48. As is also apparent, the first leg 46 continuously expands starting from the base 50; in particular, the first leg 46 expands in a funnel shape.

At its end, the first leg 46 has a connecting portion 51, which is connected to the outer sleeve 42c by substance-to-substance connection, particularly by vulcanization. As is apparent from FIG. 3, the connecting portion 51 encloses the outer sleeve 42c. At its end, the second leg 48 has a connecting portion 51 in the form of a thickened portion 52, which is connected to an outer face of the inner sleeve 42c by substance-to-substance connection, particularly by vulcanization.

Since the first leg 46 of the intermediate membrane 20 is at least twice as thick as the second leg 48, the intermediate membrane is able to execute large movements in the axial direction A and/or in radial directions R and, at the same time, has a great inflation stiffness in the case of pressure differences between the fluid chambers 24, 26; in particular, the base 50 can abut against the outer sleeve 40b in the case of large movements in the axial direction A and a simultaneously occurring pressure difference with a high pressure in the first fluid chamber 24 and a low pressure in the second fluid chamber 26. As a result, the intermediate membrane 20 has a great inflation stiffness, which results in an improved damping action.

Figure 4:
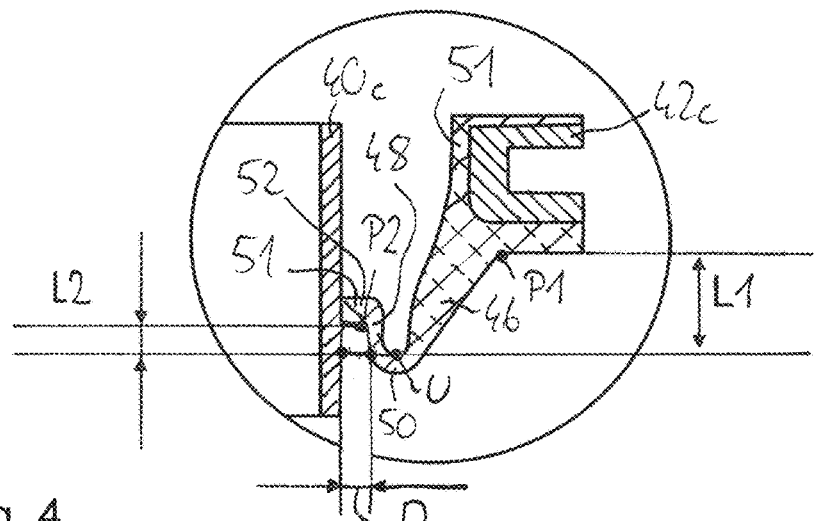
FIG. 4 shows an enlarged section of the membrane depicted in FIG. 3.

FIG. 4 shows the lengths of the legs 46, 48 and a distance A of the base 50 from the inner sleeve 42c. The first leg 46 has a first length L1, and the second leg 48 has a second length L2, the first length L1 being greater than the second length L2. In particular, the first length L1 is three times the size of the second length L2. This is necessary because the longer leg is responsible for the large mobility in translational directions. At the same time, a greater length, however, results in low inflation stiffness and thus in a low pumping capacity. This is compensated by the greater thickness of the longer leg. In this manner, a membrane geometry is realized which is characterized by a long life cycle, but at the same time also enables a good pumping action in the axial direction.

As is apparent from FIG. 4, the upper surface and the lower surface of the membrane 19 each have as uniform a profile as possible, without any major thickness changes. The length of each leg 46, 48 is defined by the distance in the Z-direction between the lower reversing point U of the base 50 and the highest attachment point P1, P2 of the respective leg 46, 48.

In the case of continuous functions describing the geometries, the mathematical derivative of the function describing the upper surface in the reversing point U of the base 50 equals zero. This also applies to the derivative of the functions describing the lower geometry of the legs 46, 48, whose mathematical derivative at their highest point P1, P2 either also becomes zero, alternatively runs off into a stiff connecting region or connecting portion 51, or may have a discontinuity. In effect, the upper attachment point of the radially outer leg is defined such that, beyond this point, appreciable elongations in the elastomer of the connecting region due to the movements of the membrane 19 no longer occur.

As is also apparent from FIG. 4, the mutually facing surfaces of the inner sleeve 40c and the second leg 48 are spaced apart from each other, wherein a distance D is between approx. 1 mm and approx. 10 mm. Advantageously, the distance A is between approx. 2 mm and approx. 3 mm. Thus, a high pumping capacity and therefore a high level of damping is obtained at large amplitudes. By configuring the distance to be as small as possible, the base 50 of the membrane 19, in the case of large amplitudes, can come to rest against a core or an inner tube and thus gain inflation stiffness, which results in a high level of damping.

In the hydraulically damping mount 10, the axial mount 16 primarily absorbs the axial pre-stresses in the Z-direction acting on the mount 10. The Z-stresses during driving are also for the most part absorbed by the axial mount 16, whereas the radial mount 18 absorbs the largest part of the radial stresses in the Y-direction that occur in operation and at the same time, due to the distance of the second stops 44 from the core 12, has a low axial stiffness or a low radial stiffness in the X-direction. Moreover, the axial mount 16 protrudes in the axial direction A from the outer tube 14 in such a way that the axial mount 14, in the inserted state, is substantially disposed outside the receiving eye. Since the axial mount 16 is disposed outside the receiving eye, it is geometrically limited, radially, not to the receiving eye but only by the available construction space outside the receiving eye, so that the axial mount 16 has a large outer diameter and thus a large elongation length. Because of the above-described different stiffness contributions on the Y- and Z-directions of the axial mount 16 and the radial mount 18 and the arrangement of the axial mount 16 outside the receiving eye, the axially damping mount 10 is capable of absorbing large static stresses or axial pre-stresses and can be configured with life cycle stability. Furthermore, the basic stiffness levels and the dynamic properties of the mount 10 can be tuned easily.

Since the axial mount 16 is capable of absorbing large axial pre-stresses in the Z-direction, the compensating membrane 22 and the intermediate membrane 20 may also be mounted in a biased manner during assembly, so that they exhibit a reduced to no axial deflection in the K0-position, as it is shown in the FIGS. 1, 2 and 4, due to the static stress or axial pre-stress in the Z-direction acting on the axial mount 16.

In the embodiment shown in FIGS. 1 to 4, the length of the first leg 46 is at least twice that of the second leg 48. Therefore, the membrane 19 is capable of executing large movements in the axial direction A and/or in radial directions R. Moreover, the average thickness of the first leg 46 is at least twice the size of that of the second leg 48. Therefore, the membrane 19 is not susceptible to inflation due to large pressure differences between the two fluid chambers 22, 24 filled with fluid. In most operational states, this leads to a high inflation stiffness of the membrane 19, which results in a large pumping volume and thus in an improved damping effect. In addition, this configuration ensures that the membrane 19 is very stiff in the case of pressure differences between the fluid chambers 22, 24.

Further embodiments of the hydraulically damping mount 10 and the membrane 19 will be described below, wherein the reference numerals already used previously will be used, in their description, for identical or functionally identical parts.

Figure 5:
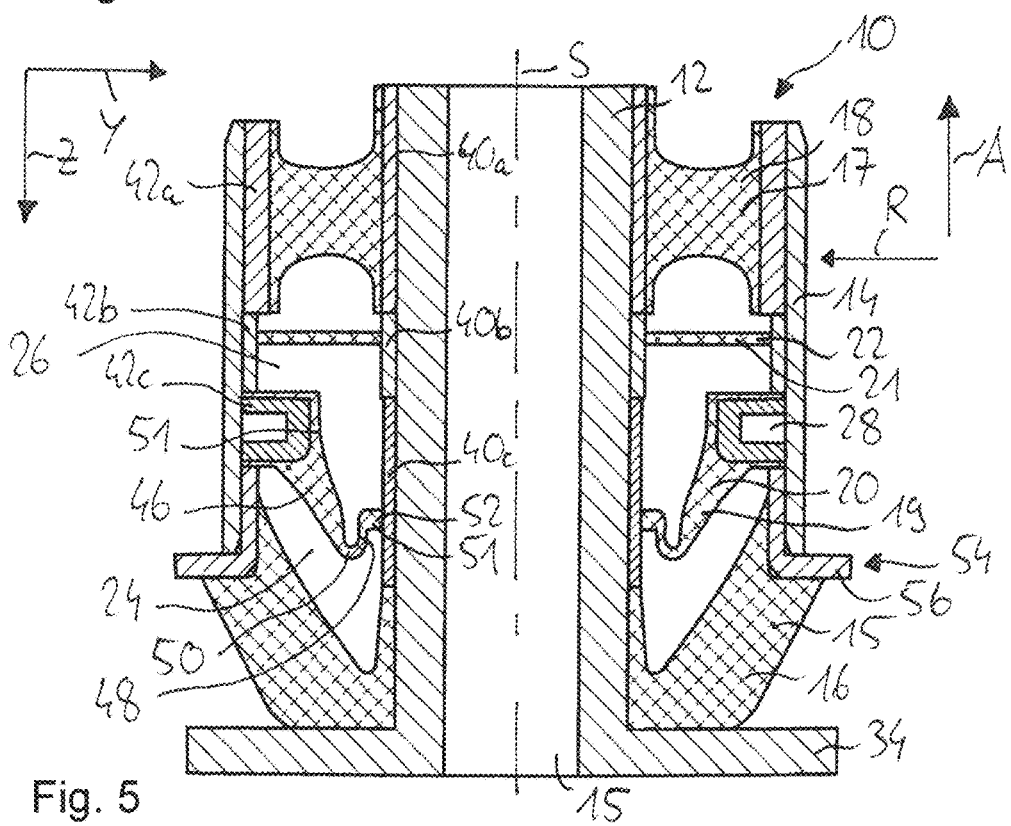
FIG. 5 shows a cross section through a hydraulically damping mount according to a second embodiment.

FIG. 5 shows a second embodiment of the hydromount 10, which differs from the first embodiment in the attachment of the first elastomer body 15 to the outer tube 14. The first elastomer body 15 is attached by vulcanization to a ring 54 with a collar 56, by means of which the first elastomer body 15 is connected to the outer tube 14. For this purpose, the ring 54 is inserted into the outer tube 14, wherein the ring can be connected to the outer tube 14 positively, non-positively and/or by substance-to-substance connection. If the ring 54, like the outer tube 15, is also made of a plastic, it is connected to the outer tube 14 by substance-to-substance connection using laser beam welding, for example, and at the same time in a sealing manner. If the ring 54 and/or the outer tube 15 are made from a metal, the two are positively and/or non-positively interconnected by the collar 56 being crimped or roller-knurled, for instance. A rubber seal, which is not shown and which seals the second fluid chamber 26, may be inserted between the ring 54 and the outer tube 14.

Figure 6:
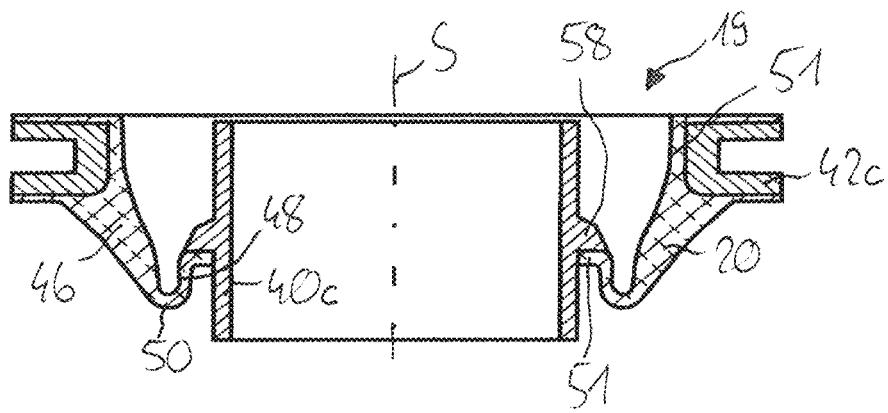
FIG. 6 shows an enlarged representation of a cross section through a membrane according to a second embodiment with an inner sleeve and an outer sleeve.

FIG. 6 shows a second embodiment of the membrane 19 configured as an intermediate membrane 20, which differs from the first embodiment by the first leg 46 being attached by vulcanization to a projection 58 projecting from the inner sleeve 40b.

Figure 7:
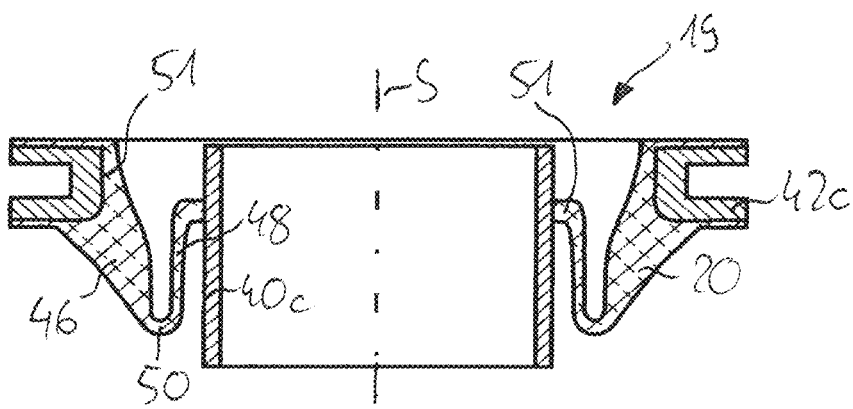
FIG. 7 shows an enlarged representation of a cross section through a membrane according to a third embodiment with an inner sleeve and an outer sleeve.

FIG. 7 shows a third embodiment of the membrane 19 configured as an intermediate membrane 20, which differs from the first embodiment by the second leg 48 being configured to be longer. In particular, the length L2 of the second leg 48 matches the length L1 of the first leg 46. Thus, the elongations in the intermediate membrane 20 occurring during the movements in the axial direction A and/or in the radial direction are reduced, so that the intermediate membrane 20 has a long life cycle and, additionally, is configured in a dynamically soft manner.

Figure 8:
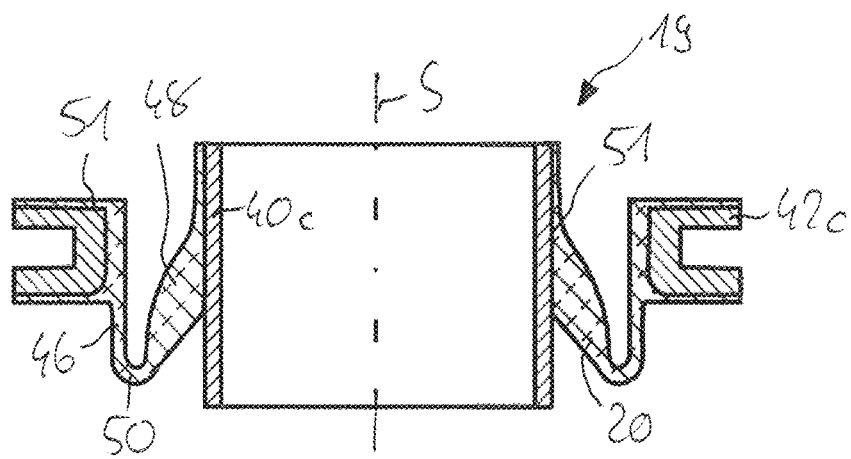
FIG. 8 shows an enlarged representation of a cross section through a membrane according to a fourth embodiment with an inner sleeve and an outer sleeve.

FIG. 8 shows a fourth embodiment of the membrane 19, which differs from the other embodiments by the radially inner second leg 48 being at least twice as thick as the radially outer first leg 48.

Figures 9, 10:
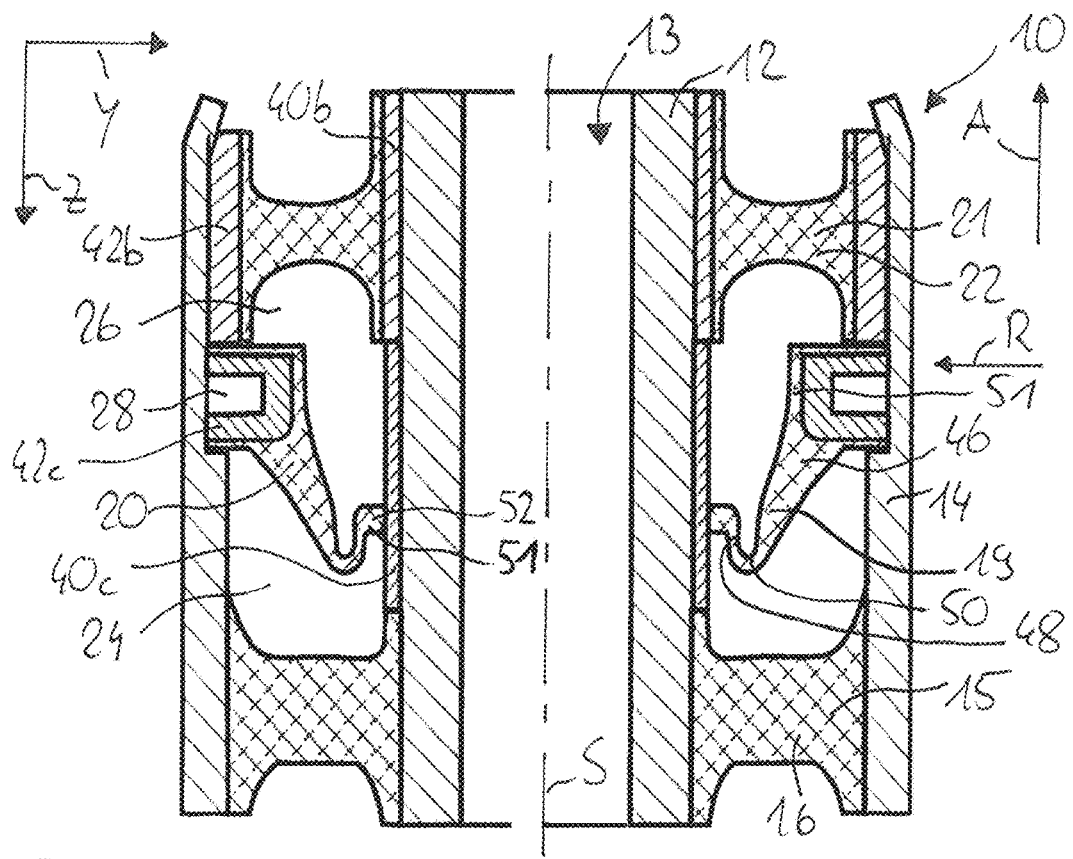
FIG. 9 shows a cross section through a hydraulically damping mount according to a third embodiment.
FIG. 10 shows a cross section through a hydraulically damping mount according to a fourth embodiment.

FIG. 9 shows a third embodiment of the hydraulically damping mount 10 that differs from the first two embodiments in that no radial mount 18 is provided and the second elastomer body 21 is thicker compared with the preceding exemplary embodiments.

FIG. 10 shows a fourth embodiment of the hydraulically damping mount 10 that differs from the third embodiment in that the second elastomer body 21 is configured to by thin-walled and has the form of a bellows 60. Since the second elastomer body 21 has the form of a thin-walled bellows 60, the second fluid chamber 26 is a low-pressure compensating chamber.

The membrane 19 is characterized in that the average thickness of one leg is at least twice the size of that of the other leg. Consequently, the membrane 19 is able to execute large movements in the axial direction A and/or in radial directions R and is not susceptible to inflation due to large pressure differences between the two fluid chambers 24, 26 filled with fluid. In most operational states, this leads to a high inflation stiffness of the membrane 19, which results in a large pumping volume and thus in an improved damping effect. In addition, this configuration ensures that the membrane 19 is very stiff in the case of pressure differences between the fluid chambers 24, 26.

The invention claimed is:

1. A membrane for a hydraulically damping mount, the membrane comprising:
    a first leg,
    a second leg, and
    a base interconnecting the two legs, the base having an approximately U-shaped cross section,
    wherein the first leg and the second leg protrude from the base,
    wherein, in a horizontal orientation of the membrane, the U-shaped cross section of the base comprises a reversing point at which the mathematical derivative of a geometric function describing a surface of the base equals zero,
    wherein, in the horizontal orientation, all portions of the two legs are arranged on one axial side of the reversing point,
    wherein an average thickness of one of the two legs is at least twice as thick as that of the other leg,
    wherein the cross section of the leg that is, on average, twice as thick continuously expands starting from the base, and
    wherein the leg that is, on average, twice as thick forms a radially outer leg, and is twice as long as the other leg.

2. The membrane according to claim 1, wherein the first leg and the second leg have at their extremities a connecting portion that can be connected positively, non-positively, and/or by substance-to-substance connection to a core and/or an outer tube of said hydraulically damping mount.

3. The membrane according to claim 2, wherein mutually facing surfaces of the connecting portion and/or an inner sleeve and a radially inner leg are spaced apart from each other by a distance, wherein the distance is between approximately 1 mm and approximately 10 mm.

4. The membrane according to claim 2, wherein the connecting portions are connected to an inner sleeve and/or an outer sleeve, wherein the inner sleeve can be pushed onto the core and the outer sleeve can be inserted into the outer tube.

5. The membrane according to claim 4, wherein a damping duct is incorporated into the outer sleeve of the membrane; and
    portions of the membrane are disposed on both axial sides of the outer sleeve.

6. A hydraulically damping mount, comprising
a core; and
an outer tube surrounding the core,
wherein a first elastomer body, the membrane according to claim 1, and a second elastomer body are disposed between the core and the outer tube,
wherein the first elastomer body and the membrane delimit a first fluid chamber, and the membrane and the second elastomer body delimit a second fluid chamber, and
wherein the first fluid chamber and the second fluid chamber are filled with a fluid and are interconnected in a fluid-conducting manner via a damping duct.

7. The hydraulically damping mount according to claim 6, wherein the second elastomer body is a compensating membrane.

8. The hydraulically damping mount according to claim 6, wherein the first elastomer body protrudes in the axial direction from the outer tube in such a way that the first elastomer body is substantially disposed outside the outer tube.

9. A hydraulically damping mount, comprising:
a core;
an outer tube surrounding the core;
a first elastomer body;
a membrane, including
a first leg;
a second leg; and
a base interconnecting the two legs, wherein the first leg is at least twice as long as the second leg, and the first leg has an average thickness that is at least twice the size of the second leg;
a second elastomer body; and
a third elastomer body;
wherein the first elastomer body, the membrane, the second elastomer body, and the third elastomer body are disposed between the core and the outer tube;
wherein the first elastomer body and the membrane delimit a first fluid chamber, and the membrane and the second elastomer body delimit a second fluid chamber; and
wherein the first fluid chamber and the second fluid chamber are interconnected in a fluid-conducting manner via a damping duct.

10. The hydraulically damping mount according to claim 9, wherein the first elastomer body is an axial mount.

11. The hydraulically damping mount according to claim 10, wherein the third elastomer body is a radial mount.

12. The hydraulically damping mount according to claim 11, wherein the radial mount has a stiffness in the Y-direction that is greater by a factor of at least 10 than its stiffness in the Z-direction.

13. The hydraulically damping mount according to claim 11, wherein the axial mount has a stiffness in the Z-direction that is greater by a factor of at least 2 than the stiffness of the radial mount in the Z-direction.

14. The hydraulically damping mount according to claim 9, wherein the first elastomer body, the second elastomer body, and/or the third elastomer body are connected positively, non-positively and/or by substance-to-substance connection to the core and/or an outer sleeve.

15. The hydraulically damping mount according to claim 9, wherein the second elastomer body and/or the third elastomer body have an inner sleeve and/or an outer sleeve, wherein the inner sleeve can be pushed onto the core and the outer sleeve can be inserted into the outer tube.

* * * * *